United States Patent Office 2,706,678
Patented Apr. 19, 1955

2,706,678

METHOD OF TREATING DORMANT PLANTS

Frank Earl Denny, Yonkers, N. Y., assignor to Boyce Thompson Institute for Plant Research, Inc., a corporation of New York No Drawing. Application August 21, 1952, Serial No. 305,695

4 Claims. (Cl. 71—2.7)

This invention relates to the control of plant growth and, more particularly, to the application of certain organic compounds to plants to control the growth of new tissue. The invention is applicable to the treatment of such storage organs as tubers, roots and bulbs, and woody plants, grasses, and related plants, during dormancy or as the new tissue emerges from dormancy.

I have discovered that lauryl bromide $CH_3(CH_2)_{11}Br$ has the specific property of delaying or inhibiting the growth of new plant tissue, and my invention provides an improved method of delaying the growth of such new tissue by contacting the plants with this compound.

The compound may be applied to the plants in dispersed or diluted forms such as vapors, sprays, or dusts and the like.

In carrying out a method of the invention in the treatment of tubers, such as potatoes for example, the lauryl bromide may be applied to the potatoes during dormancy in such a manner that the potatoes may be stored for relatively long periods without sprouting, or the compound may be applied in such manner as to retard sprouting only until the end of a desired dormant period, leaving the tubers at the end of the period in condition for sprouting as would be desirable in the case of tubers intended for planting stock.

In applying the growth regulant compound to storage organs, a very effective and presently preferred method is to place the storage organs in a confined space such as a bag, box, barrel, or room, and place therein the compound in such manner and under such conditions that the vapors contact the storage organs. The compound may be incorporated in pieces of paper or other fibrous carrier material, or mixed with inert powder such as talc or other carrier media, and the same placed on the container whereby the resulting vapors permeate the container and contact the storage organs. In the case of large containers, such as warehouses, the compound may be vaporized by heating and the air laden vapors circulated with fans to effect a suitable contact with the storage organs. Mists of the compound may also be used. The storage organs may be coated with solutions, emulsions, or powdered carriers of the compound. It is usually advisable to permit a sufficient entrance of oxygen to the container to supply the oxygen, preferably in the form of air, needed for respiration.

In the treatment of potatoes, the maximum amount of compound needed to retard sprouting is about 1 gram for each kilogram of potatoes. Good results have been obtained, however, with from $\frac{1}{10}$ to $\frac{1}{2}$ of that amount.

In the application of the invention to woody plants, I may, for example, apply the lauryl bromide to the twigs early in the spring, more especially during dormancy, and bring about a retardation of the opening of the buds for a short period, say, from 5 to 20 days. At the end of that period the buds open and continue development in a normal or near normal rate. In other words, in accordance with the method of my invention, I may delay the budding without serious injury, if any, to the buds and then permit normal development to occur.

The compound may be applied to the woody plants as vapors, sprays, or dust. Solutions of the compound in water or organic solvents such as acetone may be applied to the plants or sprays or the plants may be dipped in such solutions.

In the application of the invention to daffodils or hyacinths for example, the compound may be applied to the young plants just as they appear above the soil following a very mild winter to hold back leaf development and thus allow flower stalk development to proceed at a relatively greater rate.

Various other plants, notably the grasses used in lawns, may be treated to retard the growth, advantageously in the manner described for woody plants. The compound may be applied to the old tissue or to the new tissue to control the growth of the new tissue.

During October whole potatoes were coated with an acetone solution of lauryl bromide to apply the compound in the various amounts 0.1, 0.3, 0.5 and 1.0 g. per kg. of potatoes. The potatoes were examined the following January. Those treated with 0.1 and 0.3 g. were almost completely inhibited. Those treated with 0.5 and 1.0 g. were completely inhibited, and when cut up and planted in soil 75% and 90% sprouted, respectively.

This application is a continuation-in-part of application Serial Number 95,385, filed May 25, 1949, and now abandoned.

I claim:
1. The method of retarding the growth of plants which comprises contacting the plant while in at least a partial dormant state with the compound lauryl bromide in such concentration that the growth of the plant is effectively retarded.
2. The method of retarding the sprouting of tubers and bulbs which comprises contacting the tubers and bulbs while in a dormant state with from 0.1 to 1.0 g. of lauryl bromide per kg. of tubers and bulbs.
3. In the method of claim 1, applying the compound while in a dispersed form.
4. In the method of claim 2, applying the compound while in a dispersed form.

References Cited in the file of this patent

UNITED STATES PATENTS 2,435,204   Davidson   --------------- Feb. 3, 1948